US010884119B2

(12) United States Patent
Rogan (10) Patent No.: US 10,884,119 B2
(45) Date of Patent: Jan. 5, 2021

(54) OBJECT TRACKING IN BLIND-SPOT (71) Applicant: Ford Global Technologies, LLC, Dearborn, MI (US)

(72) Inventor: Douglas Rogan, Ferndale, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 306 days.

(21) Appl. No.: 16/003,733

(22) Filed: Jun. 8, 2018

(65) Prior Publication Data

US 2019/0377086 A1 Dec. 12, 2019

(51) Int. Cl.
*G01S 13/931* (2020.01)
*G01S 13/86* (2006.01)
*G01S 7/41* (2006.01)
*G01S 13/72* (2006.01)

(52) U.S. Cl.
CPC .............. *G01S 13/931* (2013.01); *G01S 7/41* (2013.01); *G01S 13/867* (2013.01); *G01S 13/72* (2013.01); *G01S 2013/932* (2020.01); *G01S 2013/9315* (2020.01); *G01S 2013/93272* (2020.01)

(58) Field of Classification Search
CPC ................................. G01S 7/41; G01S 13/867
See application file for complete search history.

(56) References Cited

U.S. PATENT DOCUMENTS

| | | | |
|---|---|---|---|
| 6,480,104 B1 | 11/2002 | Wall et al. | |
| 7,061,373 B2 | 6/2006 | Takahashi | |
| 7,777,615 B2 | 8/2010 | Okuda et al. | |
| 8,791,802 B2 | 7/2014 | Schwindt et al. | |
| 9,760,782 B2 | 9/2017 | Augst | |
| 9,767,696 B2 | 9/2017 | Arndt et al. | |
| 2002/0145662 A1 | 10/2002 | Mizusawa et al. | |
| 2006/0255560 A1 | 11/2006 | Dietz | |
| 2009/0005959 A1 | 1/2009 | Bargman et al. | |
| 2010/0039515 A1 | 2/2010 | Dietz | |
| 2010/0096203 A1* | 4/2010 | Freese, V | B60D 1/58 180/167 |
| 2010/0324770 A1 | 12/2010 | Ramsey et al. | |
| 2011/0216199 A1 | 9/2011 | Trevino et al. | |
| 2012/0191285 A1 | 7/2012 | Woolf et al. | |
| 2013/0226390 A1 | 8/2013 | Luo et al. | |
| 2015/0115571 A1 | 4/2015 | Zhang et al. | |
| 2016/0052548 A1* | 2/2016 | Singh | B60D 1/36 701/37 |
| 2016/0101730 A1* | 4/2016 | Shehan | G01S 13/931 340/431 |
| 2016/0252610 A1 | 9/2016 | Smith et al. | |

(Continued)

OTHER PUBLICATIONS

Notice of Allowance dated Apr. 13, 2020; U.S. Appl. No. 16/003,765, filed Jun. 8, 2018.

(Continued)

*Primary Examiner* — Marcus E Windrich
(74) *Attorney, Agent, or Firm* — Frank A. MacKenzie; Bejin Bieneman PLC (57) ABSTRACT

A point is detected from first and second sensor data. An uncertainty range is estimated for a location of the point relative to the vehicle based on a motion model. Upon determining the point exited a first sensor field of view, the uncertainty range is estimated based on data received from the second sensor and dead reckoning, and the location of the point is estimated within the uncertainty range.

18 Claims, 6 Drawing Sheets

(56) References Cited

U.S. PATENT DOCUMENTS

| | | | |
|---|---|---|---|
| 2016/0304122 A1* | 10/2016 | Herzog | B62D 15/0295 |
| 2017/0101092 A1 | 4/2017 | Nguyen Van et al. | |
| 2017/0123431 A1* | 5/2017 | Ghneim | B60W 10/184 |
| 2017/0151846 A1 | 6/2017 | Wuergler et al. | |
| 2017/0221359 A1 | 8/2017 | Kamata | |
| 2017/0341583 A1* | 11/2017 | Zhang | B60R 1/00 |
| 2017/0363728 A1* | 12/2017 | Prasad | B60W 40/12 |
| 2018/0039278 A1* | 2/2018 | Huger | B62D 15/029 |
| 2018/0061239 A1* | 3/2018 | Prasad | G06K 9/00791 |
| 2018/0272941 A1* | 9/2018 | Bliss | B60D 1/62 |
| 2018/0361929 A1 | 12/2018 | Zhang et al. | |
| 2019/0187250 A1 | 6/2019 | Ru et al. | |
| 2019/0302793 A1 | 10/2019 | Leech et al. | |
| 2019/0340787 A1 | 11/2019 | Ramirez Llanos | |
| 2019/0347498 A1 | 11/2019 | Herman et al. | |
| 2019/0347825 A1 | 11/2019 | Gupta et al. | |

OTHER PUBLICATIONS

Non-Final Office Action dated Jan. 31, 2020; U.S. Appl. No. 16/003,765, filed Jun. 8, 2018.

\* cited by examiner

OBJECT TRACKING IN BLIND-SPOT

BACKGROUND

A vehicle computer can use data received from vehicle sensors such as radar, cameras, etc., to detect objects around the vehicle and determine locations of the detected objects. A computer in an autonomous or semi-autonomous mode may operate the vehicle based on determined locations of objects around the vehicle. However, it is a problem to operate a vehicle with respect to one or more objects in a blind spot of one or more sensors of the vehicle

DETAILED DESCRIPTION

Introduction

Disclosed herein is a method including detecting a point from first and second sensor data, estimating an uncertainty range for a location of the point relative to a vehicle based on a motion model, upon determining the point exited a first sensor field of view, estimating the uncertainty range based on data received from the second sensor and dead reckoning, and estimating the location of the point within the uncertainty range.

The first sensor may be a radar and the second sensor may be a camera.

The point may be at a hitch attachment of the trailer.

The uncertainty range may have a three-dimensional area.

The method may further include estimating the uncertainty range including a likelihood of presence of the point within the uncertainty range.

The method may further include ignoring received sensor data upon determining the location of the point estimated based on the received sensor data is outside the estimated uncertainty range.

The method may further include estimating the uncertainty range based on vehicle motion sensor data.

The method may further include updating boundaries of the uncertainty range based on the received first and second sensor data upon determining that the location estimated based on the first and second sensor data is within the estimated uncertainty range.

The method may further include detecting an object from the first and second sensor data, classifying the detected object based on stored classification description information, and identifying the point on the detected object.

The method may further include identifying the point based on the stored classification description information.

Further disclosed herein is a system including a processor and a memory. The memory stores instructions executable by the processor to detect a point from first and second sensor data, estimate an uncertainty range for a location of the point relative to a vehicle based on a motion model, upon determining the point exited a first sensor field of view, estimate the uncertainty range based on data received from the second sensor and dead reckoning, and estimate the location of the point within the uncertainty range.

The first sensor may be a radar and the second sensor may be a camera.

The point may be at a hitch attachment of the trailer.

The uncertainty range may have a three-dimensional area.

The instructions may further include instructions to estimate the uncertainty range including a likelihood of presence of the point within the uncertainty range.

The instructions may further include instructions to ignore received sensor data upon determining the location of the point estimated based on the received sensor data is outside the estimated uncertainty range.

The instructions may further include instructions to estimate the uncertainty range based on vehicle motion sensor data.

The instructions may further include instructions to update boundaries of the uncertainty range based on the received first and second sensor data upon determining that the location estimated based on the first and second sensor data is within the estimated uncertainty range.

The instructions may further include instructions to detect an object from the first and second sensor data, classify the detected object based on stored classification description information, and identify the point on the detected object.

The instructions may further include instructions to identify the point based on the stored classification description information.

Further disclosed is a computing device programmed to execute the any of the above method steps. Yet further disclosed is an aerial drone comprising the computing device. Yet further disclosed is a vehicle comprising the computing device.

Yet further disclosed is a computer program product comprising a computer readable medium storing instructions executable by a computer processor, to execute the any of the above method steps.

Exemplary System Elements

A vehicle includes sensors providing data for object detection. A vehicle computer is programmed to detect a point on an object based on sensor data from a first and a second object detection sensor. Further, the computer is programmed to estimate an uncertainty range for a location of the point relative to the vehicle based on a motion model. Upon determining the point exited a field of view of the first sensor, the computer is further programmed to estimate the uncertainty range based on data received from the second sensor and dead reckoning, and to estimate the location of the point based on uncertainty range. Thus, systems and methods disclosed herein advantageously surmount problems of tracking objects in vehicle blinds spots and/or in area where received sensor data is not sufficiently precise, e.g., to facilitate hitching a trailer to a vehicle more efficiently and safely than previously possible.

Figure 1:
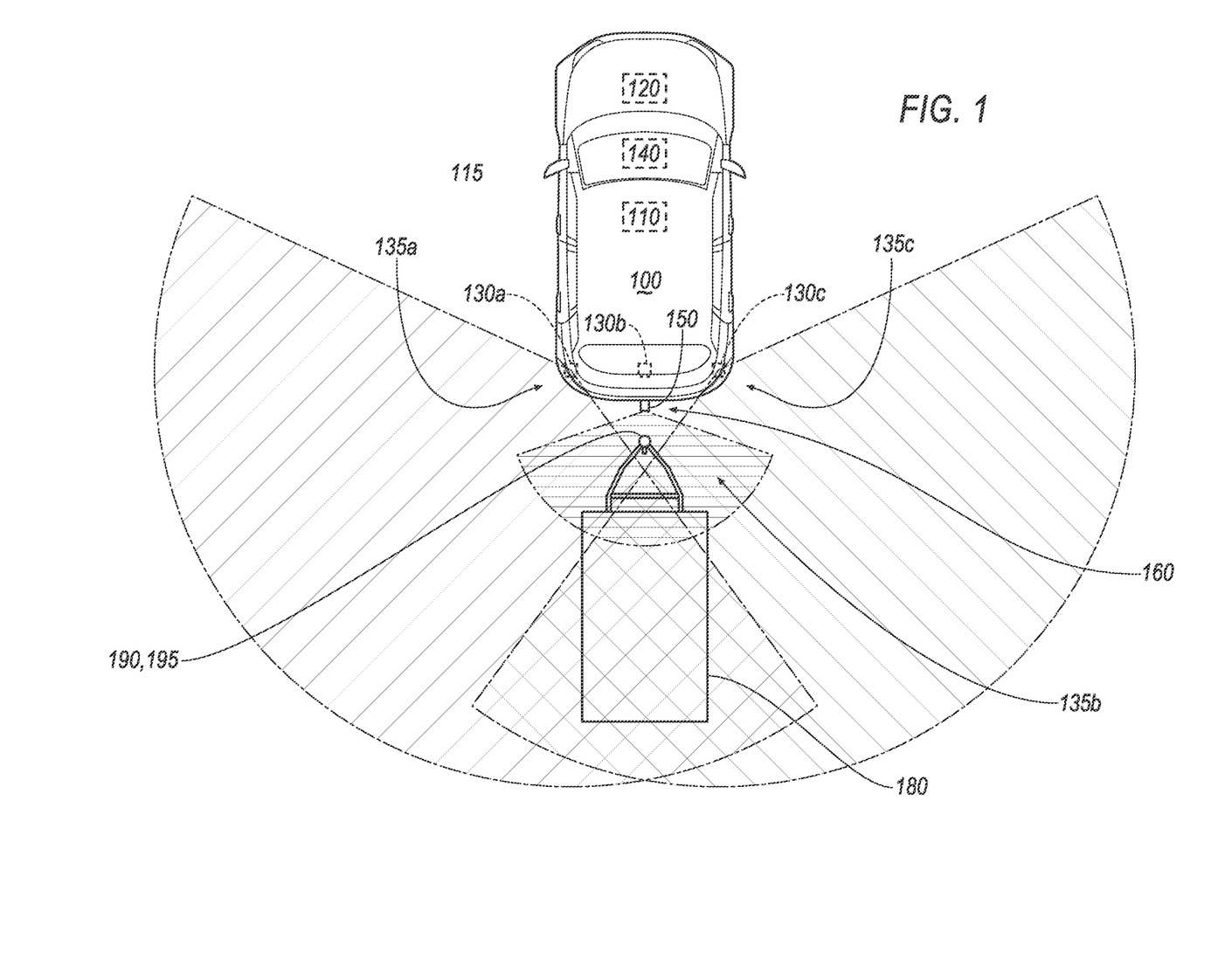
FIG. 1 is a diagram of an example vehicle and a trailer.

FIG. 1 illustrates a vehicle 100 and an object 180, e.g., a tow trailer. The vehicle 100 may be powered in a variety of known ways, e.g., with an electric motor and/or internal combustion engine. The vehicle 100 may be a land vehicle such as a car, truck, etc. A vehicle 100 may include a computer 110, actuator(s) 120, sensor(s) 130, and a human machine interface (HMI) 140. The vehicle 100 has a reference point 125, e.g., a geometrical center where a longitudinal axis and a lateral axis of a vehicle 100 body intersect. The vehicle 100 may include a hitch 150 for mechanically coupling the vehicle 100 to the object 180, e.g., a trailer.

A trailer object 180 may include a body and two or more wheels. The trailer object 180 may include a conventional hitch attachment 195 for mechanically coupling to the vehicle 100 hitch 150. Additionally or alternatively, the trailer 180 may include other types of mechanical attachments such as a coupler, lock, etc., to couple the trailer 180 to the vehicle 100. Additionally or alternatively, the trailer 180 may be mechanically coupled to the vehicle 100 via a latch lever, a screw, a padlock, etc.

The computer 110 includes a processor and a memory such as are known. The memory includes one or more forms of computer-readable media, and stores instructions executable by the computer 110 for performing various operations, including as discussed herein.

The computer 110 may operate the vehicle 100 in an autonomous or a semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicle 100 propulsion, braking, and steering.

The computer 110 may include programming to operate one or more of vehicle 100 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle 100 and/or receive messages from the various devices, e.g., an actuator 120, a sensor 130, an HMI 140, etc. Alternatively or additionally, in cases where the computer 110 actually comprises multiple devices, the vehicle 100 communication network may be used for communications between devices represented as the computer 110 in this disclosure. Further, as mentioned below, various controllers and/or sensors may provide data to the computer 110 via the vehicle communication network.

The actuators 120 can actuate various vehicle subsystems in accordance with appropriate control signals and typically include circuits, chips, and/or other electronic components. For instance, the actuators 120 may include one or more relays, servomotors, etc. The actuators 120, therefore, may be used to control braking, acceleration, and steering of the vehicle 100. The control signals used to control the actuators 120 may be generated by the computer 110, a controller, a control unit located in the vehicle 100, e.g., an electronic control unit (ECU) such as a brake controller, etc. The vehicle 100 may include various components or sub-systems, each including one or more sensors 130, actuators 120, controllers, etc. For example, the vehicle 100 may include a brake component including brake sensors 130, brake actuators 120, and/or other electronic, mechanical, etc., elements that stop the vehicle 100 based on commands received from a controller such as the computer 110. As another example, the vehicle 100 may include a powertrain component or sub-system that may include one or more actuators 120, sensors 130, etc., in addition to an engine, electric motor, and/or a transmission.

The sensors 130 may include a variety of devices to provide data to the computer 110. For example, the sensors 130 may include object detection sensors 130 such as Light Detection And Ranging (LIDAR) sensor(s) 130, radar sensor(s) 130, and/or camera sensors 130. The object detection sensors 130 may be disposed in and/or on the vehicle 100 that provide relative locations, sizes, shapes of other objects 180 such as other vehicles, trailers, etc. In one example, shown in FIG. 1, the vehicle 100 may include object detections sensors 130a, 130b, 130c, e.g., the radar sensors 130a, 130c and the camera sensor 130b. Additionally or alternatively, the vehicle 100 may include motions sensors 130 such as steering wheel sensor 130, speed sensor 130, etc. that provide one or more physical attributes of the vehicle 100 such as a steering angle, speed, etc.

When mounted to the exterior, the sensors 130a, 130b, 130c may be mounted to a rear, front, and/or a side of the vehicle 100 exterior. In the present context, a blind spot 160 is an area or, more typically, a volume outside a field of view 135a, 135b, 135c of each of the object detection sensors 130a, 130b, 130c, i.e., an area or volume from which a sensor 130 cannot obtain data. The blind spot 160 is typically a three-dimensional space, i.e., a volume. A shape or boundaries of a blind spot 160 is typically determined by one or more fields of view 135a, 135b, 135c that surround and/or abut the blind spot 160.

Respective fields of view 135a, 135b, 135c of each of one or more object detection sensors 130a, 130b, 130c may partially overlap. As the vehicle 100 and the object 180 move relative to one another, a point 190 on the object 180 may be, at a given time, within one or more fields of view 135a, 135b, 135c, and/or in the blind spot 160, i.e., outside each of the fields of view 135a, 135b, 135c. In one example, the computer 110 may be programmed to determine that a point 190 is in a blind spot of the sensors 130a, 130b, upon determining that the point 190 was detected previously, e.g., 50 ms (milliseconds) ago, within at least one of the field of view 135a, 135b. Additionally, the computer 110 may be programmed to determine that the point 190 is in the blind spot 160 upon determining that based on the motion model (discussed below) the point 190 was moving toward one of the boundaries of the field of view 135a, 135b.

The HMI 140 may be configured to receive user input, e.g., during operation of the vehicle 100. As one example, an HMI 140 may include touchscreens, buttons, knobs, keypads, microphone, and so on for receiving information from a user. Moreover, an HMI 140 may include various interfaces such as a touchscreen display, a smart phone, etc., for receiving information from a user and/or outputting information to the user.

The computer 110 may be programmed to detect and/or track an object such as the trailer object 180. Tracking, in the present context, means identifying two-dimensional or three-dimensional location coordinates of some or all of the points 190 of the object 180 relative to the reference point 125 in the vehicle 100. The reference point 125 coordinates may be stored in a computer 110 memory. Location coordinates in this context mean coordinates in a two or three-dimensional Cartesian coordinate system.

The computer 110 may be programmed to operate, including controlling a movement of, the vehicle 100, e.g., by actuating a steering, braking, and/or propulsion actuator 120 to move the vehicle 100 hitch 150 to a location of the hitch attachment 195 of the trailer object 180. In one example, the location of the hitch attachment 195 is specified by location coordinates of an end of the hitch attachment 195 spaced away from (typically, furthest from a side or bumper of) the vehicle 100. For example, the computer 110 may be programmed to navigate the vehicle 100 such that the vehicle 100 hitch 150 touches or at least vertically aligns with (i.e., the hitch 150 is substantially above or below the attachment 195) the trailer 180 hitch attachment 195.

In one example, the computer 110 may be programmed to identify a path, e.g., a curved path, from a current location of the vehicle 100 hitch to the determined location of the hitch attachment 195 and to actuate the vehicle 100 actuators 120 to navigate the vehicle 100 along the identified path to move the hitch 150 to the location of the hitch attachment 195. Thus, the computer 110 may be programmed to operate the vehicle 100 based on the location coordinates of the hitch attachment 195 and the vehicle 100 hitch 150 relative to the vehicle 100 reference point 125. However, a problem arises when the coordinates of the hitch attachment 195 are not available from vehicle 100 sensor 130 data, e.g., because of being in the blind spot 160, and/or because the received data from the sensors 130 is unreliable, e.g., the sensors 130 detect another point on the trailer (e.g., because of low light conditions) and erroneously determines its coordinates to be those of the attachment 195.

Figure 2:
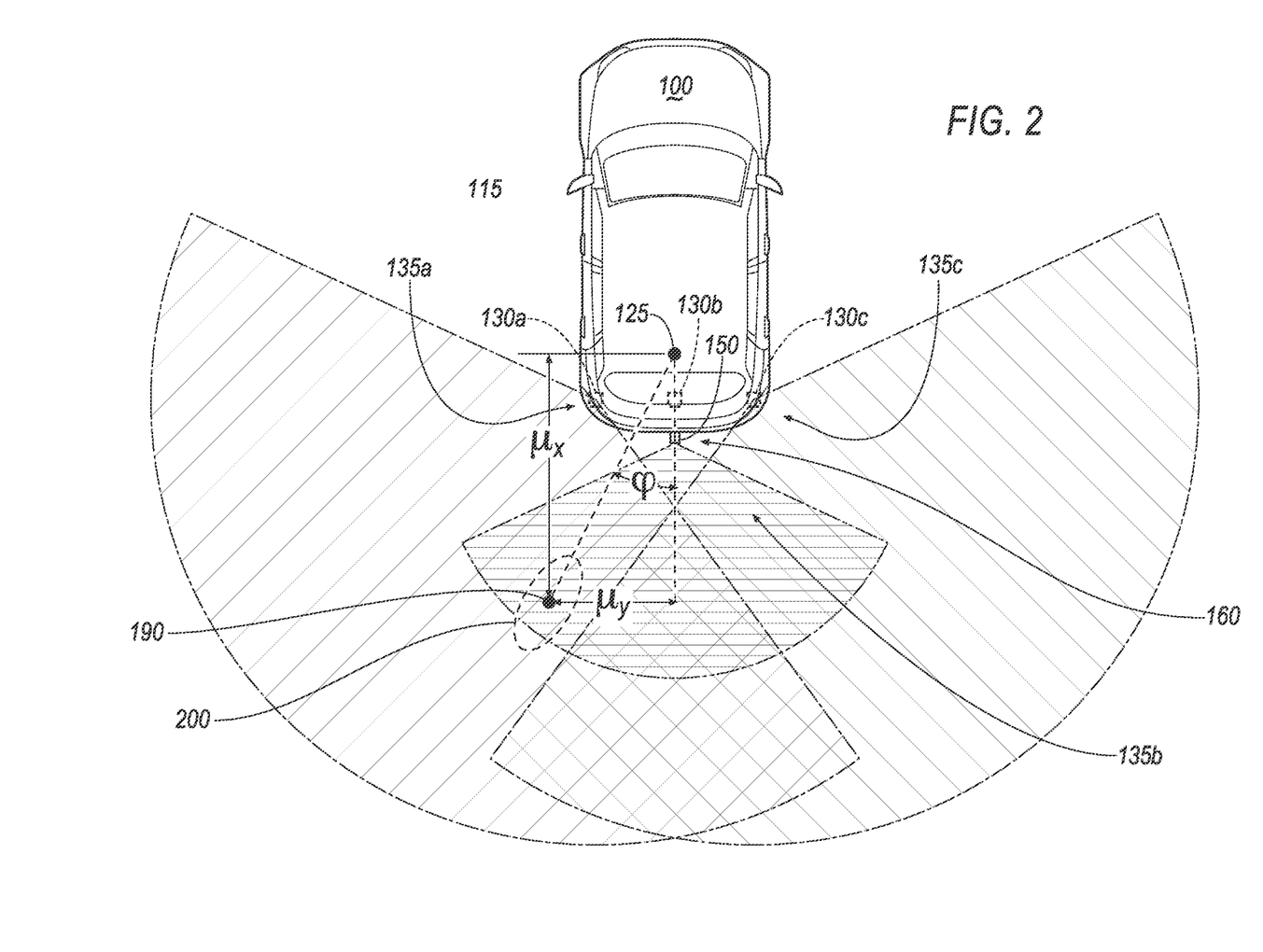
FIG. 2 is a top view of the vehicle of FIG. 1 and a point being tracking on a trailer hitch attachment.

With reference to FIGS. 1-2, the computer 110 can be programmed to detect a point 190 (on a detected object such a hitch attachment 195 of a trailer 180) based on sensor data from a first and a second object detection sensor 130a, 130b. The computer 110 can be programmed to estimate an uncertainty range 200 for a location of the point 190 relative to the vehicle 100 based on a motion model. The computer 110 can be further programmed to estimate the uncertainty range 200 based on data received from the second sensor 130b and dead reckoning upon determining that the point 190 exited a field of view 135a of the first sensor 130a, and to estimate the location of the point 190 based on uncertainty range 200.

A motion model, in the present context, means a mathematical expression which describes a movement of the point 190, based on a combination of data received from the vehicle 100 sensors 130a, 130b, 130c and/or dead reckoning, as discussed further below.

As discussed above, the computer 110 may be programmed to receive the vehicle 100 sensor 130 data from one or more object detection sensors 130a, 130b, 130c mounted to the vehicle 100, e.g., a camera, LIDAR, and/or a radar sensor 130. Additionally or alternatively, the computer 110 may be programmed to receive the vehicle 100 sensor 130 data from a vehicle 100 motion sensor 130 including a steering sensor 130, a speed sensor 130, etc. The received data from a motion sensor 130 may include one or more physical attributes such as a speed, steering angle, etc.

The uncertainty range 200 is an area where a tracked point 190 is expected to be, e.g., a gaussian distribution range 200. For example, the uncertainty range 200, in the present context, may be a 3D (three-dimensional) area, typically specified by Cartesian or polar coordinates, with a likelihood of presence of the point 190 within the uncertainty range 200. In other words, as discussed below, the computer 110 may be programmed to estimate the location of the point 190 based on the determined uncertainty range 200. In one example, the computer 110 may be programmed to determine the location of the point 190 based on the mean of the state μ, as discussed below.

The computer 110 may be programmed to identify and classify an object 180, e.g., using conventional image processing techniques. In one example, the computer 110 may store class description information describing various classifications pertaining to one or more of vehicles, trailers, trucks, bicycles, etc. A classification in this context specifies a type of object, e.g., vehicle and/or type of vehicle.

The stored classification description information may include information associated with each respective type, i.e., classification, of object 180. For example, the stored classification description information of each object type may include typical dimensions, shape, etc. of the respective type or classification of object 180. For example, the classification or type of trailer object 180 may include dimensions and shapes of trailer objects 180. The classification or type description information may further include a typical shape of hitch attachment 195. Additionally or alternatively, the classification description information may include a typical location of a target area or point on each type of object 180. For example, the classification description of the trailer object 180 may identify a point on an end of a hitch attachment 195 farthest from a bumper, body, etc. of the vehicle 100, as a target point 190 of the trailer 180. For example, the classification description may include a shape and/or dimensions of one or more types of hitch attachment 195 and may include information regarding typical location of a target point on a hitch attachment 195. The computer 110 may be programmed to identify the target point 190 using conventional image processing techniques based on the received sensor 130 data, e.g., image data, and the classification description. In the present disclosure, a target point 190 is a point that to which the vehicle 100 navigates, as discussed below.

Thus, the computer 110 may be programmed to identify the trailer object 180 based on the stored classification description and the received sensor data. For example, the computer 110 may be programmed to ignore a detected bicycle, upon determining that a request to attach the vehicle 100 to a trailer 180 is received, e.g., via the HMI 140. The computer 110 may store classification description including target point description. For example, the computer 110 may store classification information for a trailer object including description of a trailer target point, e.g., a point on an end of a hitch attachment 195 spaced away from the trailer 180.

As discussed above, the point 190 may leave a field of view 135a, 135b, 135c and may enter a blind spot 160. For example, the point 190 may be within the fields of view 135a, 135b, then leave the field of view 135a while still being within the field of view 135b, and upon further movement of the vehicle 100 and/or trailer 180, the point 190 may enter the blind spot 160. In one example, to determine location of the point 190, the computer 110 may be programmed to track the point 190. As discussed above, the computer 110 receives object detection sensor 130 data from radar, LIDAR, camera sensors 130a, 130b, etc. Each of the object detection sensors 130 may have a different expected accuracy, i.e., amount of precision, with respect to certain one or more sensor 130 measurements. "Accuracy" (or precision) herein means a measure of a deviation (or error) between an actual value of a physical parameter, e.g., speed, and a value of the physical parameter measured by a sensor 130. For example, in low light conditions, e.g., at night, a radar sensor 130a, 130b may operate more accurately (i.e., lower deviation between actual and measured coordinates) than a camera sensor 130a, 130b, whereas a camera sensor 130a, 130b has typically a higher precision than a radar sensor 130a, 130b in good light conditions, e.g., day light. Thus, an inaccuracy of sensor 130 data may result in an inability to determine location coordinates of a point 190. Thus, the computer 110 may be programmed to track the point 190 based on a combination of a dead reckoning technique using motion sensor 130 data and/or object detection sensor 130 data.

As discussed above, the computer 110 may be programmed to receive sensor 130 data from the first and second object detection sensors 130. In one example, the first and second sensors 130 are the radar sensor 130a and the camera sensor 130b. The computer 110 may identify the point 190, e.g., a point on the hitch attachment 195 from received sensor 130 data while the point 190 is within both of the fields of view 135a, 135b. For example, in a low light condition, the received radar sensor 130a data may have a higher accuracy than received camera sensor 130b data. As the vehicle 100 and/or the trailer 180 move relative to one another, the point 190 may exit the radar sensor 130a field of view 135a while still being in the camera sensor 130b field of view 135b.

As discussed further below, the computer 110 can be programmed to estimate the uncertainty range 200 for a location of the point 190 relative to the vehicle 100 based on received sensor 130b data and the motion model. Thus, while lacking the higher precision (relative to the sensor 130a data in low light conditions) data from the sensor 130a, the computer 110 may be programmed to adjust the uncertainty range 200 based on sensor 130b data and associated accuracies of the sensors 130a,130b. As also discussed below, the computer 110 may be programmed to enlarge or shrink the uncertainty range 200 and/or change a shape of the uncertainty range 200 based on the type (camera, radar, LIDAR, etc.) of sensor 130a, 130b that provides data including the point 190. For example, in a low light condition, e.g., at night, upon the point 190 leaving the field of view 135a of the radar sensor 130a while the computer 110 receives sensor 130 data only from the camera sensor 130b (which has lower precision than radar sensor 130a at night), the computer 110 may estimate a larger uncertainty range 200.

The computer 110 may be programmed to determine the point 190 location based at least in part on a last determined location, i.e., dead reckoning, and/or based in part on location data received from vehicle 100 object detection sensors 130. The dead reckoning may be based on vehicle 100 motion data, including a relationship of the point 190 of the object 180 relative to a vehicle 100 reference point 125. Motion data may include physical attributes of the vehicle 100 including a speed, heading, and steering angle.

The computer 110 may be programmed to track the point 190 on the hitch attachment 195 of the object 180 based on at least one of dead reckoning and vehicle object detection sensor 130 data using a motion model. An example is a motion model using an Extended Kalman Filter (EKF). The computer 110 may be programmed to track the point 190 based on dead reckoning, e.g., when the received sensor 130 data fails to detect the point 190, and/or data received from the sensor 130 is not acceptable, e.g., the received location coordinates are outside an expected uncertainty range 200 (as discussed further below). Additionally or alternatively, the motion model may include any simultaneous localization and mapping (SLAM) model such as a particle filter, GraphS LAM, etc.

The tracking model of the point 190 may include tracking based on sensor 130 data. The tracking model may further include a dead reckoning model to estimate location of the point 190 based on a last detected location of the point 190 and the vehicle 100 motion data.

When it is determined that the received object detection sensor 130 data does not include a location of the point 190, or is not acceptable (as discussed below), the computer 110 may be programmed to estimate the location of the point 190 using an EKF motion model based on motion sensor 130 data and last determined state of the object 180. Table 1 below shows parameters of an example EKF motion model.

TABLE 1

| Variable | Description |
| --- | --- |
| $\mu_t$ | Current state mean |
| $\bar{\mu}_t$ | Previous state propagated through motion model |
| $\Sigma_t$ | Current state covariance |
| G | Motion model Jacobian for state |
| V | Motion model Jacobian for motion data |
| $R_G$ | Trajectory uncertainty |
| $R_V$ | Motion data measurement uncertainty |

With reference to FIG. 2, Table 1, and equations (1) and (2) (see below), the computer 110 may be programmed to estimate, for a time t, a state $\mu_t$ and covariance $\Sigma_t$ of the location of points based on vehicle 100 motion data including a speed and/or a yaw rate. The parameters $\mu_t$, $\mu_{t-1}$ represent values of the state $\mu$ at times t and t−1. Equation (3) shows an example definition of the state $\mu$ which includes two dimensional coordinates $\mu_x$, $\mu_y$ of the point 190 relative to a reference point 125 of the vehicle 100 (as coordinates system reference point) and an angular location $\phi$ of the point 190 relative to a longitudinal axis of a vehicle 100. In one example, t and t−1 refer to two consecutive times when the computer 110 performs computations based on a motion model, e.g., 50 milliseconds (ms) apart based on a cyclic or periodic computation of the motion model.

The computer 110 may be programmed to determine the state $\mu$ covariance $\Sigma$ based on equation (2). The covariance $\Sigma$, in this context, is a statistical measure of correlation between motion data, e.g., speed $V_c$, yaw rate $\psi$, etc., and changes in the state $\mu$. The operator shown as a superscript T, e.g., $G^T$, is a transpose operation which flips a matrix over its diagonals.

$$\mu_t = \mu_{t-1} + \bar{\mu}_t \tag{1}$$

$$\Sigma_t = G(\Sigma_t + R_G)G^T + VR_V V^T \tag{2}$$

$$\mu = \begin{bmatrix} \mu_x \\ \mu_y \\ \phi \end{bmatrix} \tag{3}$$

In order to determine the state $\mu$ using dead reckoning, as shown in equation (1), the computer 110 may be programmed to determine a state $\mu_t$ of the point 190 at a time t by propagating the last state $\mu_{t-1}$ through the motion model as shown in example equation (4) using, e.g., the Ackerman steering model, to determine a change $\bar{\mu}_t$ of the state $\mu$, and to add the change $\bar{\mu}_t$ relative to the last state $\mu_{t-1}$. In other words, the computer 110 estimates a change $\bar{\mu}$ of the state $\mu$ based on vehicle 100 motion data, e.g., vehicle 100 speed $V_c$, and a yaw rate $\psi$, $\Delta T$, in equation (4) represents a time different between two states $\mu_t$ and $\mu_{t-1}$, e.g., 50 ms.

$$\overline{\mu}_t = \begin{bmatrix} \Delta x \\ \Delta y \\ \Delta \phi \end{bmatrix} = \begin{bmatrix} \frac{V_c}{\psi}(-\sin(\phi) + \sin(\phi + \psi \Delta T)) \\ \frac{V_c}{\psi}(\cos(\phi) - \cos(\phi + \psi \Delta T)) \\ \psi \Delta T \end{bmatrix} \quad (4)$$

$$G = \begin{bmatrix} \frac{\partial \Delta x}{d\mu_{(t-1)x}} & \frac{\partial \Delta x}{d\mu_{(t-1)y}} \\ \frac{\partial \Delta y}{d\mu_{(t-1)x}} & \frac{\partial \Delta y}{d\mu_{(t-1)y}} \end{bmatrix} \quad (5)$$

$$V = \begin{bmatrix} \frac{\partial \Delta x}{dV_{c,t}} & \frac{\partial \Delta x}{d\psi_t} \\ \frac{\partial \Delta y}{dV_{c,t}} & \frac{\partial \Delta y}{d\psi_t} \end{bmatrix} \quad (6)$$

Using equations (5) and (6), the computer 110 may be programmed to determine a Jacobian matrix G for the state μ, and a Jacobian matrix V for the motion data. The Jacobian matrix G includes partial derivatives of the motion Δx and Δy with respect to the state variables $\mu_{(t-1)x}$, $\mu_{(t-1)y}$. The Jacobian matrix V includes partial derivatives of the motion Δx and Δy with respect to the motion data, e.g., the vehicle 100 speed $V_c$ and yaw rate ψ. Table 2 shows parameters pertaining to updating the state based on received sensor 130 data.

TABLE 2

| Variable | Description |
|---|---|
| K | Kalman gain matrix |
| H | Measurement model Jacobian w.r.t. state |
| Q | Measurement noise |
| z | Current measurement |
| ẑ | Expected measurement |

As discussed above, the computer 110 may be programmed to track the point 190 by dead reckoning using motion sensor data, as discussed with reference to equations (1)-(6), and/or updating the location coordinates using object detection sensor 130 data, e.g., data received from radar sensor 130a, 130b, camera sensor 130a, 130b, etc. In one example, with reference to Tables 1-2 and equations (7)-(9), the computer 110 may be programmed to update the state μ based on received data from radar, camera, etc. sensors 130a, 130b.

The measurement noise Q represents noise included in sensor 130 data. The measurement noise Q may vary based on a sensor 130 type. For example, the measurement noise Q of a radar sensor 130a, 130b is typically different compared to measurement noise Q of a camera sensor 130a, 130b. The measurement noise Q for the sensors 130a, 130b may be determined using empirical techniques. For example, a target point may be moved within the field of view 135a, 135b of a sensor 130a, 130b and the measurement noise Q may be determined by comparing the received sensor 130a, 130b data to ground truth data, e.g., known location coordinates of the target point at any time. Parameters z, ẑ represent (a) determined location coordinates based on received sensor data and (b) the location coordinates estimated based on dead reckoning, respectively. Equation (7) shows how a gain matrix K is computed. As shown in equation (8), the gain matrix K is applied as a multiplier to a difference between a measured sensor value z and an expected sensor value ẑ, which is determined based on dead reckoning, in order to determine a new state $\mu_t$. Equation (9) shows how a new state covariance $\Sigma_t$ is determined. The matrix I is an identity matrix.

$$K = \Sigma_{t-1} H (H \Sigma_{t-1} H^T + Q)^{-1} \quad (7)$$

$$\mu_t = \mu_{t-1} + K(z - \hat{z}) \quad (8)$$

$$\Sigma_t = (1 - KH) \Sigma_{t-1} \quad (9)$$

However, as discussed above, the object detection sensor 130a, 130b data may be unacceptable because of poor accuracy, e.g., a blurry image can be received from a camera sensor 130a, 130b at night due to darkness. For example, the computer 110 may detect a different point as the point 190b due to camera sensor 130a, 130b inaccuracy caused by low light conditions. Thus, the computer 110 may be programmed to determine whether to accept the received object detection sensor 130a, 130b data. "Accept," in this context means to receive and use the received data as an input for tracking the point 190. Upon determining that the received object detection sensor 130a, 130b data is acceptable, the computer 110 may be programmed to update the state μ based on the received object detection sensor 130a, 130b data. In one example, the computer 110 may be programmed to determine whether the received data from the object detection sensor 130a, 130b is acceptable by determining a distribution range such as an example range 200 shown in FIG. 2. In one example, the computer 110 may be programmed to determine a circular or ellipse-shaped range 200 based on a mean value of the state μ, and the covariance Σ. For example, the range 200 may be a circle centered at the mean value of state μ, and a radius derived from the covariance Σ. The term "mean," in the present context is a standard statistical measure that represents a central tendency of the data, e.g., an average value. A "central tendency," as is known in the field of statistics, is a central or typical value for a probability distribution. A central tendency may also be referred to as a center or location of the distribution.

For example, the computer 110 typically receives polar coordinates from a radar sensor 130, i.e., coordinates including a linear distance and an angle relative to a reference point 125 and a line of origin, e.g., a longitudinal axis of the vehicle 100. Thus, the computer 110 may be programmed to perform a transformation of measurements between the Cartesian coordinate system and the polar coordinate system, as shown in equation (10), and to determine the Jacobian matrix H for the radar sensor 130a, 130b data based on equation (11).

$$\begin{bmatrix} r \\ \varphi \end{bmatrix} = \begin{bmatrix} \sqrt{\mu_x^2 + \mu_y^2} \\ \operatorname{atan2}(\mu_y, \mu_x) \end{bmatrix} \quad (10)$$

$$H = \begin{bmatrix} \frac{\partial r}{\mu_x} & \frac{\partial r}{\mu_y} \\ \frac{\partial \varphi}{\mu_x} & \frac{\partial \varphi}{\mu_y} \end{bmatrix} = \begin{bmatrix} \frac{\mu_x}{\sqrt{\mu_x^2 + \mu_y^2}} & \frac{\mu_y}{\sqrt{\mu_x^2 + \mu_y^2}} \\ -\frac{\mu_y}{\mu_x^2 + \mu_y^2} & \frac{\mu_x}{\mu_x^2 + \mu_y^2} \end{bmatrix} \quad (11)$$

In another example, the range 200 may be ellipse-shaped and defined based on the covariance Σ and the mean of the state μ. Equation (13) shows a mathematical definition of the covariance Σ. Parameters $\sigma_x$ and $\sigma_y$ are standard deviations of the error (inaccuracy) defining semi-major and semi-minor axes of the ellipse shaped range 200 that surrounds the mean of state μ in, e.g., a Gaussian distribution. In other words, the ellipse shaped range 200 may be defined by a center point at the mean of state μ, dimensions of semi-major and semi-minor based on parameters $\sigma_x$ and $\sigma_y$.

$$\Sigma = \begin{bmatrix} \sigma_x^2 & \sigma_x \sigma_y \\ \sigma_y \sigma_x & \sigma_y^2 \end{bmatrix} \quad (13)$$

$$\Sigma = \begin{bmatrix} 3 & 2 \\ 2 & 3 \end{bmatrix} \quad (14)$$

$$V_1 = \begin{bmatrix} V_{1x} \\ V_{1y} \end{bmatrix} = \begin{bmatrix} -0.707 \\ 0.707 \end{bmatrix} \quad (15)$$

$$V_2 = \begin{bmatrix} V_{2x} \\ V_{2y} \end{bmatrix} = \begin{bmatrix} 0.707 \\ 0.707 \end{bmatrix} \quad (16)$$

$$\theta_{minor} = \operatorname{atan2}(V_{1y}, V_{1x}) = \operatorname{atan}2(0.707, -0.707) = 135 \text{ degrees} \quad (17)$$

$$\theta_{major} = \operatorname{atan2}(V_{2y}, V_{2x}) = \operatorname{atan}2(0.707, 0.707) = 45 \text{ degrees} \quad (18)$$

With reference to FIG. 2, the computer 110 may be programmed to determine angles $\theta_{minor}$/$\theta_{major}$ of semi-minor and/or semi-major axes (relative to a reference line extending from the vehicle 100 reference point 125 or a line parallel thereto) of the ellipse-shaped range 200 based on eigenvectors $V_1$ and $V_2$ of the covariance $\Sigma$. The eigenvectors $V_1$, $V_2$ indicate directions of the semi-major and semi-minor axes of the ellipse-shaped range 200, as shown in FIG. 2. For example, with reference to equations (14) to (16), the computer 110 may be programmed to determine the eigenvectors $V_1$ and $V_2$ based on an example covariance of equation (14). With reference to equations (17) and (18), the computer 110 may be programmed to determine the angles $\theta_{minor}$, $\theta_{major}$ in units of degrees (or radians) relative to a reference line extending from the vehicle 100 reference point 125. For example, a value 0 (zero) degrees for angles $\theta_{minor}$/$\theta_{major}$ means a semi-minor or semi-major is parallel to the reference line extending from the vehicle 100 reference point 125. An operation a tan 2(y, x) returns an arc tangent of variables x and y.

Figure 3A:
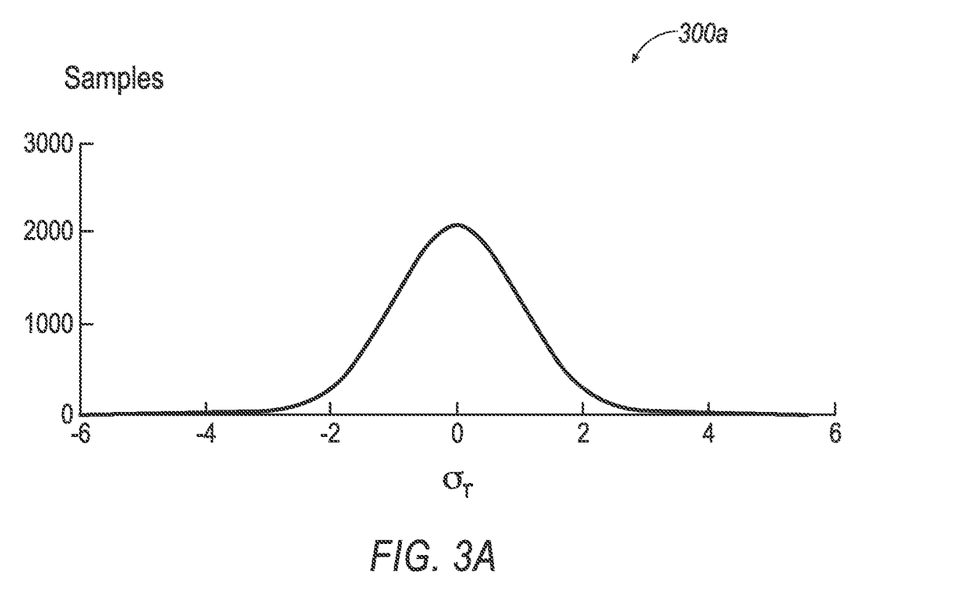
FIG. 3A is an example graph showing distance distribution of measurements data received from an example radar sensor.
Figure 3B:
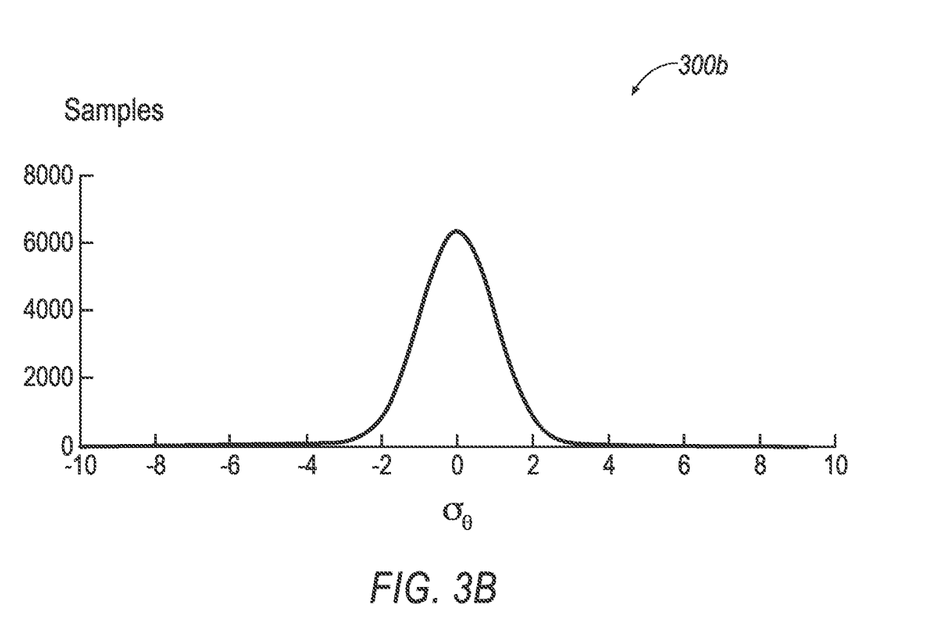
FIG. 3B is an example graph showing angular distribution of measurements data from the example radar sensor.
Figure 4:
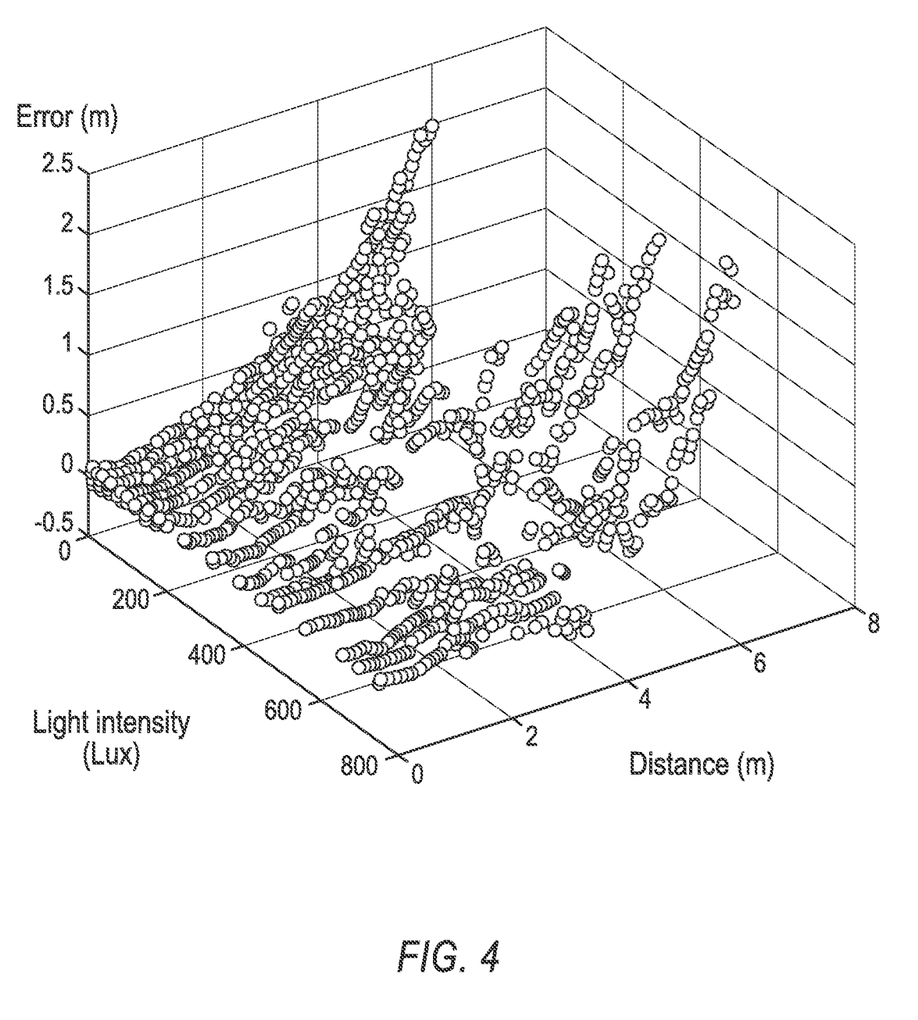
FIG. 4 is a graph showing distribution of measurements data received from an example camera sensor.

As discussed above, various types of object detection sensors 130 may have different precisions. Graphs 300a, 300b of FIG. 3 illustrate distribution of measurements data received from an example radar sensor 130a, whereas a graph 400 of FIG. 4 illustrates distribution of measurements data received from an example camera sensor 130b. The example graphs 300a, 300b illustrates measurements distributions for 27000 measurements. Thus, y axis of graphs 300a, 300b illustrates number of samples a given value of $\sigma_r$ and $\sigma_\theta$, i.e., error with respect to polar coordinates of the point 190. As shown in the graph 400, in contrast to radar sensor 130a of graphs 300a, 300b, the camera sensor 130a measurement variance (or error) is multi-dimensional and non-linear. "Multi-dimensional" in the present context, consistent with its plain and ordinary meaning, means depending on more than one variable, e.g., distance to the target point 190 and light intensity, e.g., specified in units of lux. "Non-linear," in the present context, carries its plain and ordinary meaning in mathematics and refers to a relationship between the inaccuracy of measured data versus (a) the light intensity and (b) the distance to the target point 190.

The computer 110 may be programmed to determine a measurement noise Q based on stored measurement distributions of the sensors 130a, 130b. For example, the computer 110 may be programmed to look up a measurement noise Q associated with received camera sensor 130b data based on stored camera sensor measurement distribution, e.g., the graph 400. The computer 110 may be further programmed to determine the measurement noise Q based on a current uncertainty range 200. As shown in the example graph 400, the measurement noise of the camera sensor 130b may be non-linearly dependent on the light intensity and the distance of the object 180. The computer 110 may be programmed to look up the measurement noise Q using the graph 400 based on an actual light intensity (e.g., received from a light sensor 130) and last estimated mean of the distance to the point 190. Additionally or alternatively, upon receiving data from the radar sensor 130a, the computer 110 may be programmed to adjust the noise measurement Q based on measurements distribution of the radar sensor 130a, e.g., the graphs 300a, 300b, and last estimated mean of the polar coordinates of the point 190.

The computer 110 may be programmed to ignore the received object detection sensor 130 data upon determining that the received data is not acceptable. Thus, the computer 110 may be programmed to update the uncertainty range 200 (i.e., update boundaries of the uncertainty range 200) upon determining that the received object detection sensor 130 data is acceptable.

Further, the computer 110 may be programmed to update the measurement noise Q based on a measurement distribution of the sensor 130 that provides the data (e.g., look up in the measurement distribution graph 400). In one example, where the first sensor 130a is a radar sensor 130a and the second sensor 130b is a camera sensor 130b, upon the point 190 exiting the field of view 135a while staying in the field of view 135b, the computer 110 does not receive radar sensor 130a data and may determine the uncertainty range 200 based on the camera sensor 130b and dead reckoning. In one example, when the point 190 exits the radar sensor 130a field of view 135a while remaining within the field of view 135b of the camera sensor 130b, then dimensions and/or shape of the uncertainty range 200 may change, e.g., due to at least different measurement distributions of the radar sensor 130a compared to measurement distributions of the camera sensor 130b. The computer 110 may be programmed to determine the uncertainty range 200 based on dead reckoning upon determining that the point 190 enters the blind spot 160.

Processing

Figure 5A:
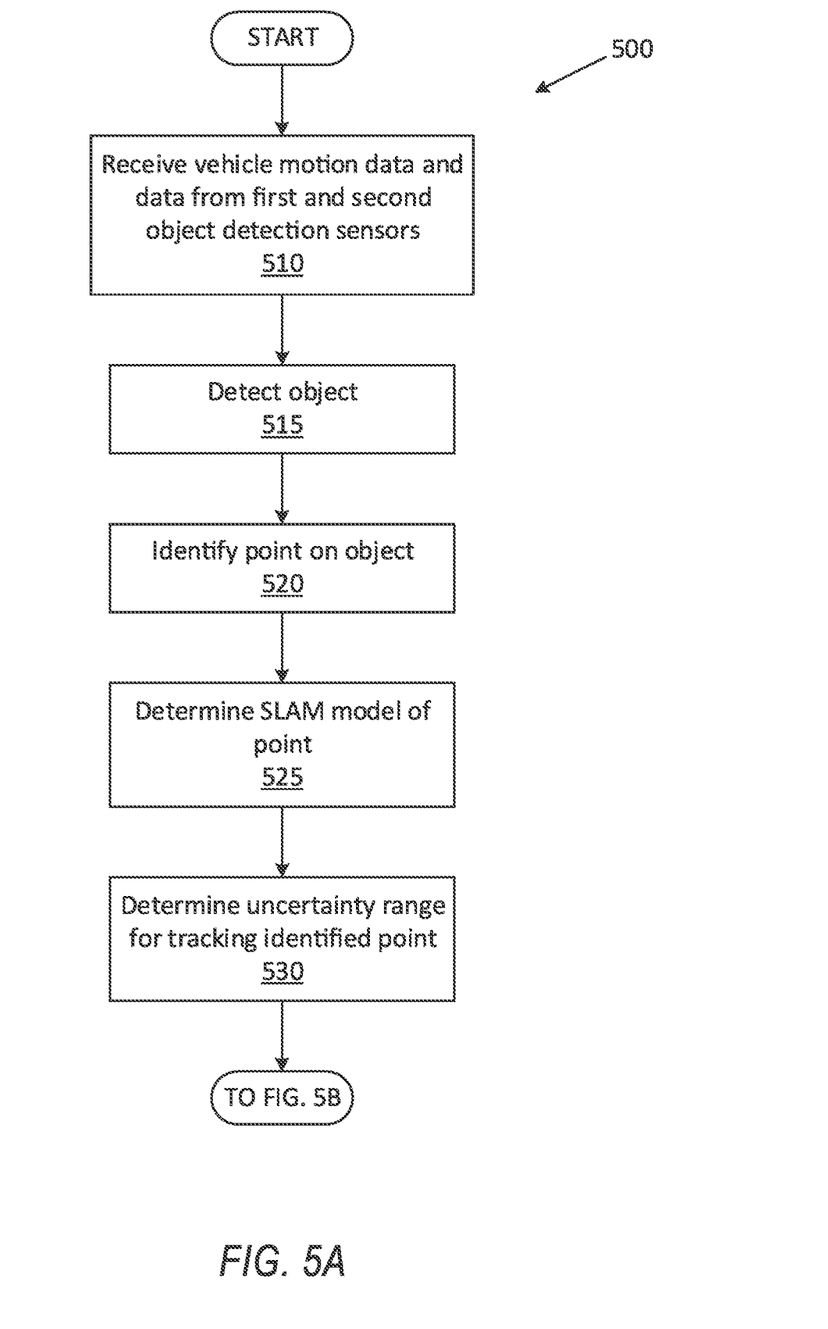
FIGS. 5A-5B accumulatively show a flowchart of an exemplary process for tracking the point of FIG. 2 and navigating a vehicle hitch to the trailer hitch attachment.
Figure 5B:
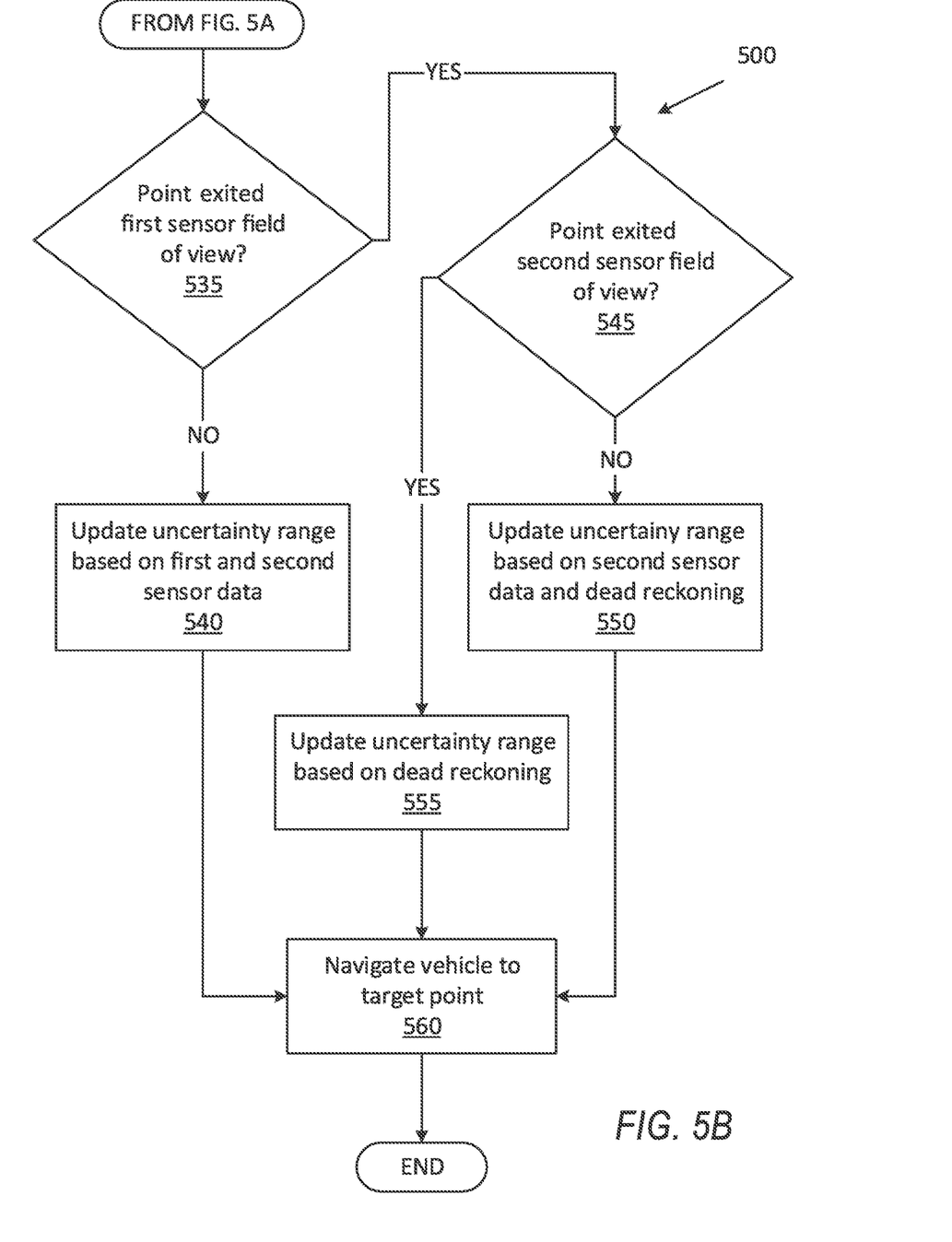

FIGS. 5A-5B collectively show a flowchart of an exemplary process 500 for tracking the point 190 and navigating the vehicle 100 hitch 150 to the trailer 180 hitch attachment 195. The computer 110 may be programmed to execute blocks of the process 500.

With respect to FIG. 5A, the process 500 begins in a block 510, in which the computer 110 receives sensor 130 data including vehicle 100 motion data and object detection data from a first and a second object detection sensors 130a, 130b. For example, the first sensor 130a may be a radar sensor 130a, and the second sensor 130b may be a camera sensor 130b. The fields of view 135a, 135b may partially overlap. Additionally or alternatively, the computer 110 may be programmed to receive object detection data from multiple object detections sensors 130a, 130b, 130c. The vehicle 100 motion data may include the speed, steering angle, etc.

Next, in a block 515, the computer 110 detects an object 180. The computer 110 may be programmed to identify and classify the object 180, e.g., a trailer 180, using image processing techniques. The computer 110 may be programmed to identify the trailer 180 based on the stored classification description and the received object detection sensor 130 data.

Next, in a block 520, the computer 110 identifies a point 190 (or a target point 190) on the detected object 180. The computer 110 may identify the target point 190 based on the received object detection sensor 130 data and stored classification description information including description of a target point on the respective object 180.

Next, in a block 525, the computer 110 determines a SLAM model for the target point 190. For example, the computer 110 may determine an EKF model such as one described above with respect to equations (1) to (7).

Next, in a block 530, the computer 110 determines an uncertainty range 200 for the identified point 190. The computer 110 may be programmed to determine the uncertainty range 200 based on the received data from the first and second object detection sensor 130.

Continuing in FIG. 5B, next, in a decision block 535, the computer 110 determines whether the point 190 exited the field of view 135a of the first sensor 130a. If the computer 110 determines that the point 190 exited the first sensor 130a field of view 135a, then the process 500 proceeds to a decision block 545; otherwise the process 500 proceeds to a block 540.

In the block 540, the computer 110 updates the uncertainty range 200 based on data received from the first and second object detection sensors 130a, 130b. For example, the computer 110 determines the uncertainty range 200 based on data received from the radar sensor 130a and the camera sensor 130b. Following the block 540, the process 500 proceeds to a block 560.

In the decision block 545, the computer 110 determines whether the point 190 exited the field of view 135b of the second sensor 130b. If the computer 110 determines that the point 190 exited the field of view 135b, the process 500 proceeds to a block 555; otherwise the process 500 proceeds to a block 550.

In the block 550, the computer 110 updates (or adjusts) the uncertainty range 200 based on data received from the second sensor 130b, and dead reckoning based on the vehicle 100 motion data. As explained above, the computer 110 may be programmed to update the measurement noise Q based on the sensor 130b, e.g., the example graph 400, to perform a motion model computation using equations (7)-(9), and to determine updated state $\mu$ and covariance $\Sigma$. The computer 110 may be further programmed to determine a location of an updated uncertainty range 200 based on the updated $\mu$, as described above. The computer 110 may be programmed to determine dimensions and/or angular location of the uncertainty range 200 based on the updated covariance $\Sigma$, e.g., as described with respect to example equations (14)-(18). Following the block 540, the process 500 proceeds to a block 560.

In the block 555, the computer 110 updates (or adjusts) the uncertainty range 200 based dead reckoning. Thus, in the absence of object detection sensor 130a, 130b data, the computer 110 updates the uncertainty range 200 based on the vehicle 100 motion data, e.g., speed, steering angle, etc. The computer 110 may be programmed to determine an updated state $\mu$ and covariance $\Sigma$, e.g., using equations (1) and (2), based on the received vehicle 100 motion data. The computer 110 may be further programmed to determine a location of an updated uncertainty range 200 based on the updated $\mu$. The computer 110 may be programmed to determine dimensions and/or angular location of the uncertainty range 200 based on the updated covariance $\Sigma$, as described with respect to example equations (14)-(18). Following the block 555, the process 500 proceeds to the block 560.

In the block 560, the computer 110 navigates the vehicle 100 to the target point 190. The computer 110 may be programmed to actuate a vehicle 100 propulsion, steering, and/or braking actuator 120 to move the vehicle 100 hitch 150 location to the location of the point 190c on the hitch attachment 195. Following the block 560 the process 500 ends, or alternatively returns to the block 510, although not shown in FIGS. 5A-5B.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A method, comprising:
   receiving data at a processor from a first sensor of a vehicle and a second sensor of the vehicle;
   detecting a point within a first field of view of the first sensor and a second field of view of the second sensor from the data received from the first sensor and from the second sensor;
   receiving motion data of the vehicle at the processor; and
   estimating a location of the point and an uncertainty range for the location of the point relative to the vehicle based on a motion model, wherein the motion model is based at least in part on the data from the first and second sensors when the point is in both the first field of view and the second field of view; and
   upon determining the point exited the first field of view, updating the estimated uncertainty range based on the data received from the second sensor and based on dead reckoning;
   wherein the location of the point in the motion model at a specified time is determined by using the uncertainty range at a previous time.

2. The method of claim 1, wherein the first sensor is a radar and the second sensor is a camera.

3. The method of claim 1, wherein the point is at a hitch attachment of a trailer.

4. The method of claim 1, wherein the uncertainty range has a three-dimensional area.

5. The method of claim 1, further comprising ignoring data received from the first sensor upon determining that a location of the point estimated based on the data received from the first sensor is outside the estimated uncertainty range.

6. The method of claim 1, further comprising estimating the uncertainty range based on the motion data.

7. The method of claim 1, wherein the motion model is based on the received first and second sensor data when a location estimated based on the first and second sensor data is within the estimated uncertainty range.

8. The method of claim 1, further comprising:
   before detecting the point, detecting an object from the first and second sensor data; and
   classifying the detected object as a specific type based on stored classification description information;
   wherein detecting the point includes detecting the point on the detected object.

9. The method of claim 8, further comprising identifying the point based on the stored classification description information.

10. A system, comprising a processor and a memory, the memory storing instructions executable by the processor to:
    receive data from a first sensor of a vehicle and a second sensor of the vehicle;
    detect a point within a first field of view of the first sensor and a second field of view of the second sensor from the data received from the first sensor and from the second sensor;
    receive motion data of the vehicle at a processor; and
    estimate a location of the point and an uncertainty range for the location of the point relative to the vehicle based on a motion model, wherein the motion model is based at least in part on the data from the first and second sensors when the point is in both the first field of view and the second field of view; and
    upon determining the point exited the first field of view, update the estimated uncertainty range based on the data received from the second sensor and based on dead reckoning;
    wherein the location of the point in the motion model at a specified time is determined by using the uncertainty range at a previous time.

11. The system of claim 10, wherein the first sensor is a radar and the second sensor is a camera.

12. The system of claim 10, wherein the point is at a hitch attachment of a trailer.

13. The system of claim 10, wherein the uncertainty range has a three-dimensional area.

14. The system of claim 10, wherein the instructions further include instructions to ignore data received from the first sensor upon determining that a location of the point estimated based on the data received from the first sensor is outside the estimated uncertainty range.

15. The system of claim 10, wherein the instructions further include instructions to estimate the uncertainty range based on the motion data.

16. The system of claim 10, wherein the motion model is based on the received first and second sensor data when a location estimated based on the first and second sensor data is within the estimated uncertainty range.

17. The system of claim 10, wherein the instructions further include instructions to:
    before detecting the point, detect an object from the first and second sensor data; and
    classify the detected object as a specific type based on stored classification description information;
    wherein detecting the point includes detecting the point on the detected object.

18. The system of claim 17, wherein the instructions further include instructions to identify the point based on the stored classification description information.

* * * * *